Aug. 9, 1927.

O. DE ARAUJO

VEHICLE WHEEL

Filed May 18 1927

1,638,621

INVENTOR
OLAVO de ARAUJO
By D.F. Wolchan... Atty.

Patented Aug. 9, 1927.

1,638,621

UNITED STATES PATENT OFFICE.

OLAVO DE ARAUJO, OF LONDON, ENGLAND.

VEHICLE WHEEL.

Application filed May 18, 1927, Serial No. 192,286, and in Great Britain December 4, 1925.

This invention, which relates to wheels for road vehicles, has for its object an improved construction and arrangement of a wheel which provides for the efficient absorption of shocks due to the wheel passing over a bad road surface, so that said shocks are not transmitted to the wheel axle.

The invention has particular reference to the type of wheels wherein to absorb shocks there is interposed between the hub of the wheel and the felly thereof, a cushion for the purpose of allowing of the give-and-take movement of the wheel, in a vertical direction, due to the resilient action of the cushion aforesaid.

In the above connection it is known that hollow hubs have been employed, and also that the hub, cushion and the felly have been so constructed as to prevent their turning relatively to one another, i. e. the abutting surfaces of the inner and outer members and the interposed resilient cushion being formed with inter-engaging corrugations, and, further, it is also known that the hub, cushion and the felly of a wheel have been prevented from lateral movement, relative to one another, by means of side plates positioned one each side of said hub, cushion and felly, secured together by transversely disposed screwed bolts and nuts, whilst allowing of the give-and-take movement of the wheel, in a vertical direction, due to the resilient action of the cushion aforesaid.

The present invention is characterized in that the abutting surfaces of the hub, the felly and the interposed resilient cushion are flat and arranged in prism formation to prevent their turning relatively to one another, and that the hub and felly are hollow, and that the felly is constituted by a hollow annular T-head to which side plates or rings are secured by bolts passed through the hollow T-head, said plates or rings extending inwardly of said T-head to form annular gaps therebetween and the leg of the T-headed felly, and that said plates or rings extend beyond said felly to embrace a solid rubber tyre thereon, and that there extend into the gaps aforesaid, so as to be movable therein, the side plates or rings, which embrace the hollow hub, cushion and leg of the hollow annular T-head felly, and are secured together by bolts passed through said hollow hub to prevent lateral movement of said hub, cushion and felly relatively to one another.

For a clear understanding of the invention, reference is to be had to the following description and accompanying sheet of drawings, wherein:—

Like numerals of reference indicate corresponding parts in the several figures.

Figure 1:
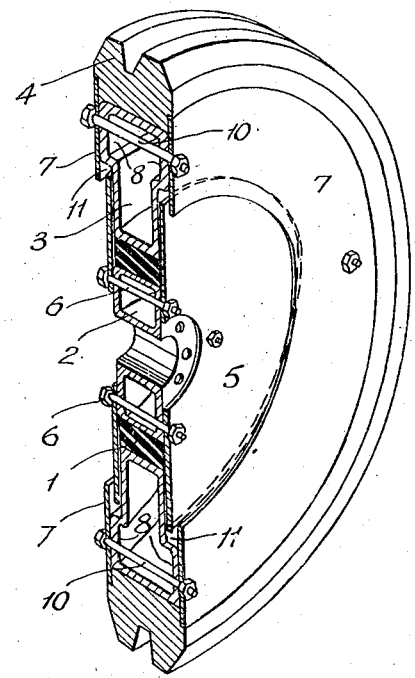
Figure 1 is a sectional perspective view of a practical embodiment of the invention.

In carrying out the invention, and referring to the drawings, a solid rubber cushion 1 of suitable form is fitted around a hollow wheel hub 2, and around said cushion 2 there is fitted a hollow annular, T-shape in cross-section, ring or felly 3, the outer peripheral surface of the T receiving thereon a solid rubber tyre 4, the hub 2, cushion 1 and felly 3 being maintained in position by means of flat plates or rings 5 positioned one each side of said hub 2, cushion 1 and felly 3 by means of bolts, screws or the like 6 passed through the plates or rings 5 and the hollow hub 2 aforesaid.

Figure 3:
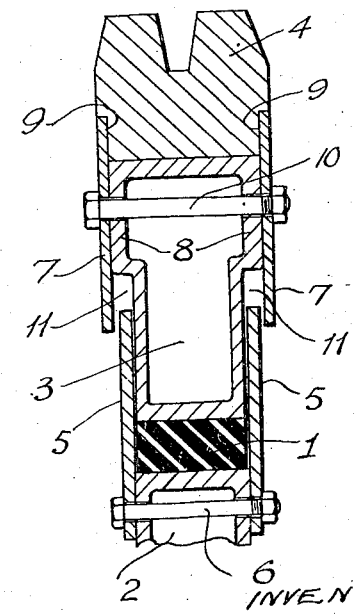
Figure 3 is a fragmentary vertical transverse sectional view, drawn to an enlarged scale, showing the side plates in position.

Further, the tyre 4 and the plates or rings 5 are maintained in position against lateral movement on the felly 3 by means of flat plates or rings 7 positioned one each side of the T-head 8 of the felly 3, engaging in recesses 9 in the tyre 4 and overlapping the plates or rings 5, said plates or rings 7, felly 3 and tyre 4 being held together by means of bolts, screws of the like 10, as shown more clearly in Figure 3 of the drawings.

Further, the diameter of the plates or rings 5 and the width of the head 8 of the felly 3 is such that there obtains an annular space 11 located each side of the felly 3 and the head 8 thereof to permit of the movement of the plates or rings 5 across the wheel, due to the resilient action of the cushion 1 aforesaid.

Figure 2:
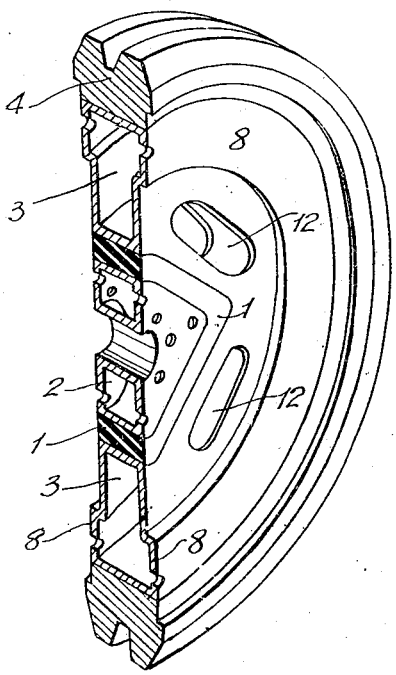
Figure 2 is a similar view, but showing the side plates of said wheel removed.

In Figure 2 is shown the mode of constructing the hub, cushion and felly to prevent turning movement of said hub 2, cushion 1 and felly 3 relative to one another, that is to say, the hollow hub 2 is formed with a substantially square, transversely flat perimeter with rounded corners on which fits the correspondingly shaped inner perimeter of the cushion 1 whose exterior perimeter is correspondingly shaped and receives thereon the correspondingly shaped inner perimeter of the hollow felly 3, the plates or rings 5 being secured to the hollow hub 2 by means of bolts 6, as shown in Figure 3, disposed near the inner periphery of said plates or rings 5. The plates or rings 5 are retained against lateral movement by the inner edges of the plates 7 which, extending toward the centre of the wheel, overlap the said plates 5 as shown. Cut-away parts, such as 12, may be made in the felly 3 to afford lightness in weight.

The wheel hub, cushion, felly and the plates or rings form, in effect, an internal unit for attachment and detachment to and from an axle.

Further, although the invention has only been described and shown with reference to a solid rubber cushion, yet it is to be understood that an equivalent cushion can be equally well employed.

The perimeter of the hollow hub 2 and the corresponding shapes of the cushion member 1 and of the inner periphery of the felly 3 need not necessarily be of the square form shown, but may be of any other suitable shape having any number of flat sides or being otherwise formed so that relative rotation of the said parts cannot take place.

I claim:—

1. A resilient wheel of the kind set forth, characterized in that the abutting surfaces of the hub, felly and interposed cushion are flat and arranged in prism formation to prevent their turning relatively to one another, and that the hub and felly are hollow, and that the felly is constituted by a hollow annular T-head provided with side plates secured to said T-head by bolts passed through the same, said plates extending inwardly of said T-head to form annular gaps therebetween and the leg of the T-headed felly, and said plates extending beyond said felly to embrace a solid rubber tyre thereon.

2. A resilient wheel of the kind set forth, characterized in that the abutting surfaces of the hub, felly and interposed cushion are flat and arranged in prism formation to prevent their turning relatively to one another, and that the hub and felly are hollow, and that the felly is constituted by a hollow annular T-head, provided with side plates secured to said T-head by bolts passed through the hollow T-head, said plates extending inwardly of said T-head to form annular gaps therebetween and the leg of the T-headed felly, and said plates extending beyond said felly to embrace a solid rubber tyre thereon, and in that there extend into the gaps aforesaid, so as to be movable therein, side plates which embrace the hollow hub, cushion and the leg of the hollow annular T-head felly. and are secured together by bolts passed through said hollow hub to prevent lateral movement of said hub, cushion and felly relatively to one another.

3. A resilient wheel, including an angular hub portion, a felly of T-shaped cross section having a central angular opening corresponding to the angular shape of the hub, a cushion interposed between the angular faces of the hub and the felly, a cushion tire carried by the periphery of the felly, plate members secured to the hub and covering the cushion element between the hub and the felly, and ring-like plates secured to the widened head of the T-shaped felly and overlapping said first mentioned plates and extending beyond the periphery of the felly to embrace the side portions of the tire carried by the felly.

In testimony whereof I have hereunto affixed my signature this 22nd day of April 1927.

OLAVO DE ARAUJO.